United States Patent [19]

Gehrmann et al.

[11] 4,362,616

[45] Dec. 7, 1982

[54] APPARATUS FOR MOVING THE FILTER PLATES OF A FILTER PRESS

[75] Inventors: Gerd-Peter Gehrmann, Gerlafingen; Peter Spiegel, Oberbuchsiten, both of Switzerland

[73] Assignee: Von Roll AG, Gerlafingen, Switzerland

[21] Appl. No.: 248,045

[22] Filed: Mar. 27, 1981

[30] Foreign Application Priority Data

Apr. 30, 1980 [CH] Switzerland .................. 3351/80

[51] Int. Cl.³ .......................................... B01D 25/12
[52] U.S. Cl. .................................. 210/225; 210/230; 100/198
[58] Field of Search .............. 210/230, 225, 232; 100/198; 162/398; 264/258, 324, 325; 425/338, 339, 340, 341

[56] References Cited

U.S. PATENT DOCUMENTS

| | | | |
|---|---|---|---|
| 3,306,455 | 2/1967 | Lesmer | 210/230 |
| 3,915,863 | 10/1975 | Busse et al. | 210/230 |
| 3,951,808 | 4/1976 | Harp | 210/230 |
| 4,179,377 | 12/1979 | Schotten | 210/230 |
| 4,184,960 | 1/1980 | Schotten | 210/230 |
| 4,197,199 | 4/1980 | Gribbin et al. | 210/230 |
| 4,197,203 | 4/1980 | Wilms | 210/230 |

*Primary Examiner*—David R. Sadowski

[57] ABSTRACT

A filter press having a plurality of plates adapted to be arranged in abutting relationship in an operating position and to be separated from the operating position for cleansing, replacement or the like, having a pair of first and second reciprocable conveyors arranged respectively along opposing side edges of the plates. Each of said first and second conveyors carry first and second members respectively for engaging the plates selectively during movement of said conveyors, so that when moved in one direction each of the first conveyors and first engaging members act to move the first of said plates from the operating position while each of the second conveyors and second engaging members when moved in an opposite direction act to retain the second of the plates in the operating position.

7 Claims, 6 Drawing Figures

APPARATUS FOR MOVING THE FILTER PLATES OF A FILTER PRESS

BACKGROUND OF THE INVENTION

The present invention relates to the construction of a filter press and in particular to apparatus by which the filter plates are movable so that after opening the press the first filter plate is separated while the second and remaining filter plates are held in position.

Filter presses have been provided with means for sequentially moving the individual filter plates so as to expose them for cleaning or the like. In general, the filter plates are moved by chain drives, one chain drive being located on each side of the filter plates on either the press frame or on a frame above the plates. Means are arranged on the chain drives to hook onto a projection on the filter plates, thereby driving the latter. The chain drives travel round in a continuous manner and perform a reciprocating movement. On moving the filter plates, it frequently happens that not only the first filter plate is moved but, due to the sticking together of the individual plates, two or more such plates are moved, which is undesirable and constitutes a fault in the operation of the filter press. It has been known therefore to attempt to combine the apparatus for displacing the filter plates with means which seeks to ensure that only the first filter plate can be moved.

In a known construction, shown in British Pat. No. 1,441,316, a pivotable blocking member is arranged on each filter plate and engages with a rack, so that each plate is held in position in form-locked manner. The blocking member must be first released from the rack to displace the filter plate. This method of locking each individual filter plate constitute a costly solution and in addition the release of the locking mechanism is not reliable.

In another known construction shown in European patent application No. 0002101, a carriage with a spring-loaded latch or catch is arranged above the filter plates and engages in a rack rail. The carriage also carries a pivotable retaining lever securing in each case the subsequent filter plate, so that it cannot be moved in displacing the first filter plate. After moving a filter plate, the displacement mechanism must release first, the retaining lever and then secondly move the carriage sufficiently to ensure that the lever engages with respect to the subsequent second filter plate, thereby enabling the displacement mechanism to remove the first filter plate. Due to the need for an additional carriage and a rack, this solution is relatively costly.

According to another known construction shown in German DAS No. 1,295,517, two chain drives are arranged on either side of the filter plates. They serve merely to move the filter plates, one part of the plate being displaced by one chain drive and the other part thereof by the other chain drive. However, it is not possible to hold back the second filter plate.

The object of the present invention is to so further develop apparatus of the aforementioned type wherein both the displacement of the first filter plate and the retaining of the subsequent filter plate is possible with simple construction and minimum expenditure.

SUMMARY OF THE PRESENT INVENTION

According to the present invention the filter press is provided with a pair of first and second continuous conveyors, the pairs being mounted respectively along opposing side edges of the press. Each of the conveyors is provided with means for engaging, selectively, the filter plates which is preferably provided with cooperating laterally extending pins. The first conveyors and their associated engaging means are arranged to move the first filter plate while the second conveyors and their associated engaging means act to retain the second and subsequent plate at the abutting operating position.

Preferably, the engaging means comprise pivotable levers, which permit the conveyors to move, by being out of position from engagement with the plates, until the proper time for engagement with the first and second plates, as required.

Full details of the present invention are set forth in the following description and are shown in the accompanying drawings.

DETAILED DESCRIPTION OF THE PREFERRED EMBODIMENTS

Figure 1:
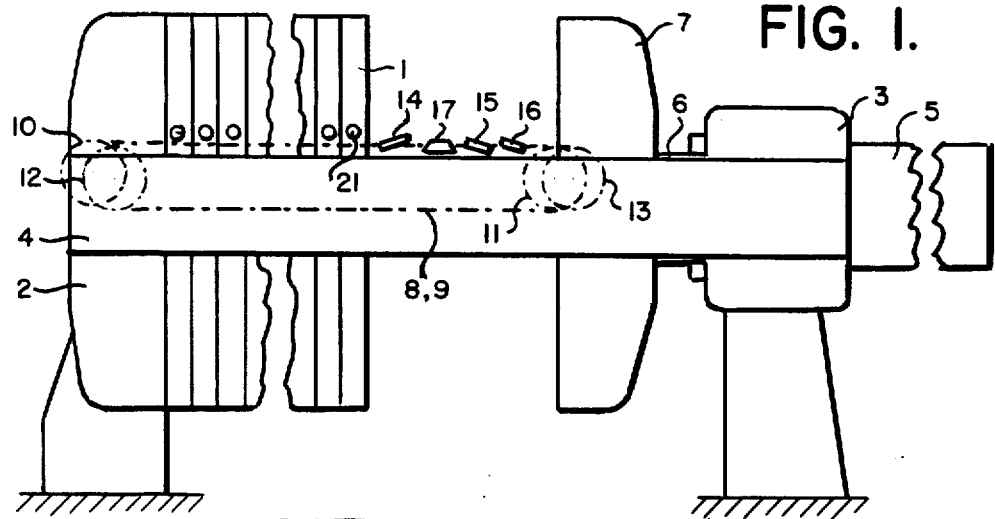
FIG. 1 is a side view of a diagrammatically shown filter press in the open state.

The filter press shown schematically in FIG. 1 has a plurality of filter plates 1 displaceably mounted in a press frame constituted by a fixed top column 2, a fixed bottom column 3 and a tension member 4 linking the two columns 2, 3. A thrust piston drive 5, e.g., a hydraulic cylinder-piston unit is fixed to the bottom column 3 and a movable head member 7 is secured to its piston rod 6. As a result of the force exerted on the head member 7 by the thrust piston drive 5, the filter plates 1 may be squeezed together and held in their operating position. In order to clean the filter plates 1, the filter press is opened by moving the head member 7 toward the end column 3. When cleaning, each individual filter plate is sequentially moved from the operating position toward this end and the filter cake formed on it is freed. The general construction of the filter press is well known and need not further encumber this disclosure. Reference can be made to the aforementioned patents if necessary for further details.

Figure 4:
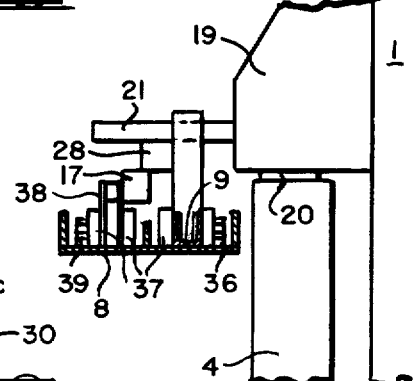
FIG. 4 is a vertical section through the two conveyors of FIGS. 2 and 3.

The filter plates 1 are provided on either side with a laterally extending shoulder 19 by which it is supported on the tension member 4 and is displaceable on a slide 20 made, for example, from metal or plastic interposed therebetween. On either side of each filter plate 1, a driving pin 21 is fixed to the shoulder 19 and extends laterally therefrom. The details are seen in FIG. 4.

The filter plates 1 are moved by a displacement mechanism, diagrammatically shown in FIG. 1. On each side of the filter plates 1, a pair of parallel continuous conveyors, for example link chains 8 and 9, are arranged on the tension members 4. The link chains 8, 9 are guided over uniformly sized sprocket wheels 10, 11 and 12, 13 respectively so that their upper strands or runs are juxtaposed (i.e. on the same horizontal plane). However, since it is necessary that only the upper strands be so juxtaposed and therefore different sized wheels can be used and arranged accordingly. The first chain 8, which is positioned in front of the second chain 9, carries a driving lever 14 and a trip or stop lever 15, whilst the second chain 9 carries a retaining lever 16. A cam 17 is provided on the first chain 8 between driving lever 14 and stop lever 15.

The driving lever 14 is of the first class having a depending shoulder 31 freely journalled about a link pin 34 in the chain 8. The forward or pry arm 29 of the lever 14 is longer than its rear arm 30, and is provided with a hook-like working end 29a which is adapted to cooperate with the pin 21 on the filter plate and a cam shaped upper edge 29b having an enlarged top-knot 29c, just to the rear of its working end. A torsion spring 23, having one end secured to the chain and the other end abutting a stop on the lever 14, biases the lever 14 so that the pry arm is normally urged upward and the rear arm downward. The engagement of the rear arm on the chain 8 limits the biasing of the spring and movement of the lever.

The stop lever 15 is similarly a first class lever having a depending shoulder 32 journalled freely about a link pin 35 of the chain 8. Its pry arm 24, lying in opposition to the driving lever 14, is longer than its rear arm 25 and is also normally biased upward by a torsion spring 22 similarly mounted. The upper edge 24b of the stop lever 15 is also shaped to form a cam surface and has a hooked end 24a which is adapted also to cooperate with the pins 21, of the filter plate. The rear arm also acts to limit movement of the lever.

The retaining lever 16, also of the first class, is similarly journalled by a shoulder 33 pivoted about a pin 36 on chain 9. Its pry arm 26 is longer than its rear arm 27 and is not spring loaded so that the pry arm 26 normally falls downward. A laterally extending finger 28 is provided at its front end 26a, to extend over and ride on the cam 17. The front end is hook like to cooperatingly engage with the lateral pins 21 extending from the filter plates.

The cam 17 is firmly fixed by a pair of shoulders mounted on adjacent chain pins and is provided with a pair of oppositely inclined sides and a flat top.

It is to be noted that hook ends of the driving lever 14 and the stop lever 15 are directed oppositely to each other, and spaced so that the cam 17 lies between them. The lever 16 is mounted on the inner chain 9, and its hook like end faces in a direction similar to that of the end of lever 15.

Chains 8 and 9 are adapted to be selectively reciprocable over short back and forth spans as well as movable in either direction over longer spans.

Figure 2A:
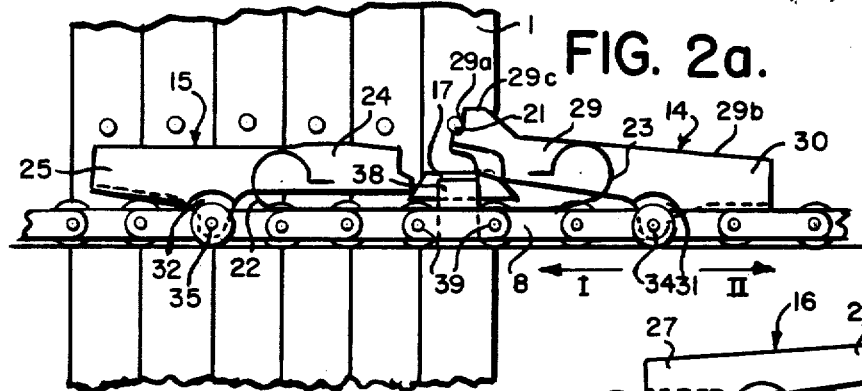
FIGS. 2a, 2b and 2c are sequential illustrations in an enlarged scale, showing the first conveyor with the associated engagement means in operation to displace the first filter plate, FIGS. 2a, 2b and 2c being taken from the side opposite FIG. 1.
Figure 3:
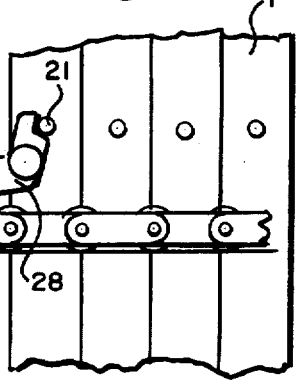
FIG. 3 is a partial side view in an enlarged scale of a second conveyor with the associated engagement means for retaining the second filter plate.

The operation of the apparatus can now be followed from FIGS. 2-3 in each of which the operative or dirty side of the press is on the right and the clean or inoperative side of the press is on the left. In FIG. 2a, the first chain 8 moving in direction of the arrow I has already carried by means of the driving lever 14 engaging the pin 21, an emptied filter plate 1 against a plurality of already emptied plates 1 engaging with the not shown head member 7. Stop lever 15 is pivoted by camming of its upper edge into a position where it has been moved below the pins 21 of the preceding plates 1. By means of driving lever 14 engaging the pin 21, the first chain 8 exerts a force on the last-supplied filter plate 1 until the drive belonging to the first chain 8 is reversed and has moved in the opposite direction II.

Figure 2B:
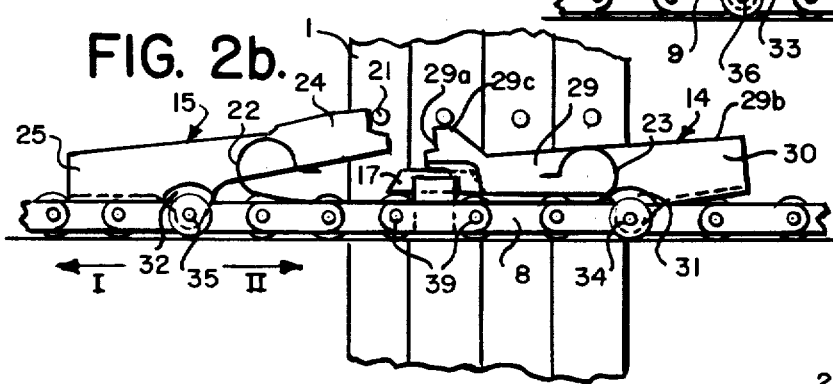
Figure 2C:
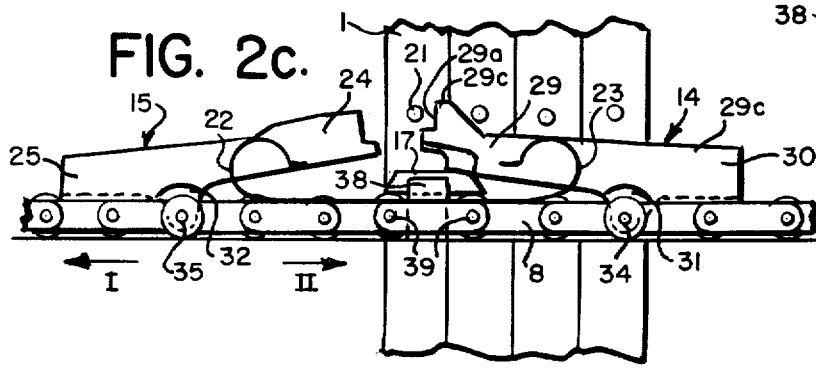

As seen in FIG. 2b, when the first chain 8 is moved in the direction of arrow II the driving lever 14 disengages from the pin 21 and its upper edge is caused to ride along the lower edges of the pins 21 of those plates still pressed in operative position against the fixed plate 2. The top-knot 29c causes the lever 14 to move downwardly against the spring 23. Simultaneously the first chain 8 carries the cam 17 and the stop lever 15 in the same direction II. When the stop 15 is moved outside the emptied filter plates 1, it is brought upright by the torsion spring 22 and consequently its pry arm 24 projects into the vicinity of pin 21 of the first plate left on the dirty side of the press, whilst its other arm 25 rests on the first chain 8 and consequently fixes the position of the stop lever 15. The first chain 8 is jogged to the right, until the hook end 24a of the stop lever 15 engages the pin 21 of the first filled or dirty filter plate 1, at which time the chain 8 is stopped. Meanwhile the driving lever 14 having been pivoted below the driving pin 21 of the first dirty filter plate 1 and behind it is not operative. The first chain 8 is then reversed in direction toward the left (arrow I) releasing engagement of stop lever 15. Upon this movement the spring 23 forces the working end 29a of drive lever 14 upwardly (allowing the top-knot 29c to move between the pins 21) so that the hook end 29a moves into engagement with the pin 21 of the first plate, as seen in FIG. 2c.

Simultaneously, the second chain 9 on which the retaining lever 16 is mounted is moved to the right in the direction II. In this movement the retaining lever 16, is free of contact with any of the plates due to the fact that its forward end has fallen by its own weight. As the forward end 26a reaches the vicinity of the cam 17, its lateral finger 28 engages and rides on the cam 17 and is raised. Due to the position of cam 17 between the levers 14 and 15, raising of the lever 16, causes its hook like front end to move between the pins 21 of the first and second dirty plates and engage the pin 21 on the second of the series of plate 1. Chain 9 is then stopped and held in this position, as seen in FIG. 3.

While retaining lever 16 holds the second plate, chain 8 is activated to move to the left in the direction I pushing the leading or first plate ahead of it, toward the head member 7. Since chain 9 is being at the same time urged to the right, the retaining lever 16 prevents the second plate from being displaced with the first plate. The chain 8, moving toward the left, carries with it the stop lever 15, the rear arm 25, of which, eventually engaging the pins 21 of the previously displaced plates, causing the lever 15 to pivot against the spring 22 and move into the generally horizontal position, seen in FIG. 2a. The chain 8 carries the displaced plate 1 until it is pressed fully against the previously removed plate, again as seen in FIG. 2a. Chain 9 may then be moved into the direction I releasing the second plate, which now becomes the first plate and the cycle is repeated over again repetitively until all of the soiled plates are displaced.

In this way, one filter plate after the other may be moved from the working position to the empty position, the retaining lever 16 always engaging on the second filter plate, whilst holding back the remaining plates. When the final filter plate has been displaced for emptying purposes, the second chain drive 9 is moved toward the left, fully, and guides the retaining lever 16 into the vicinity of head member 7. When the first chain 8 has moved the last filter plate 1 to the plates collecting at head member 7, it is moved in the opposite direction also to the side of head member 7. After closing the press, levers 14, 15, 16 are once again located on the side where a further displacement process of the filter plates can commence. It is advantageous to use separate drives for driving the two chains 8, 9. However, it is also conceivable to use a single drive with corresponding transmission, and/or clutches, thereby performing both the movements of the first and the second chain.

As seen in FIG. 4, guiding rollers 37 are mounted on the journalling pins 34, 35 and 36. This facilitates the movement of chains 8, 9 and during the return of levers 14, 15, 16 permits the guidance of chains 8, 9 in the lower runs or strand by means of guide rails, which prevents fouling or sagging of chains 8, 9. In a similar manner, cam link 17 is mounted by means of a base 38 on pins 39 of the first chain 8. By mounting the cam 17 adjustably on the base 38, the precise position for the correct operation of retaining lever 16 can be set.

Using a minimum of components, the aforementioned apparatus permits both the displacement of the filled filter plates 1 for emptying purposes and also the holding back of the second filled filter plate 1, which ensures a troublefree operation.

The power for driving the chains can be provided by a hydraulic motor subject to the action of a suitable pressure network. As a result, the force exerted on driving pin 21 when filter plate 1 is stationary can be limited, whilst the direction of movement can be reversed by measuring the speed change at the hydraulic motor. While the endless conveyors have been shown as chains, it will be appreciated that an endless belt or equivalent mechanism can be used.

Due to the greater weight of arm 26 retaining lever 16 pivots into the lower position. However, it is also possible to provide a spring on lever 16, whose spring tension can force the lever into the lowered position. In each case, cam 17 ensures the raising of retaining lever 16 into the engagement position.

Various modifications, changes and alternatives have been suggested. Others will be obvious to those skilled in this art. Accordingly, it is intended that the present disclosure be taken as illustrative and not as limiting of the invention.

What is claimed:

1. In a filter press having a plurality of plates adapted to be arranged in abutting relationship in an operating position and to be separated from said position for cleansing, replacement or the like, each of said plates being provided with a pin extending laterally from two opposite side edges thereof, apparatus for separating the plates one at a time comprising a pair of first and a pair of second reciprocable link chain conveyors arranged with one each of said first and second reciprocable link chain conveyors respectively along said opposite side edges of said plates, said first conveyors carrying first engaging means comprising a driving lever and a stop lever, said levers being two-armed, pivotable and spring-biased and having a cam mounted between them, and said second conveyors carrying a second engaging means comprising a retaining lever having a pin engageable with said cam, said conveyors and their associated engaging means for providing that when moved in one direction, each of said first conveyors and first engaging means act to move the first of said plates from said operating position by engagement of said driving levers with the pins attached to said first plate while each of said second conveyors and second engaging means when moved in an opposite direction act to retain the second of said plates in the operating position by engagement of said retaining levers with the pins attached to said second plate.

2. The apparatus according to claim 1 including third engaging means pivotably mounted on each of said first conveyors for limiting the movement of said first conveyor in a direction opposite to the direction for separation of said plates.

3. The apparatus according to claim 2, wherein said first, second and third engaging means are journalled on connecting pins of the link chain, the forward ends of said levers cooperating with the pins on said plates to provide engagement between said levers and said plates.

4. The apparatus according to claim 3, including spring means for normally biasing said first and third levers toward engagement with said pins.

5. The apparatus according to claim 3 wherein the cam means mounted on each of said first conveyors between the levers forming the first and second engaging means, cooperates with the lever forming the second engaging means to move said second engaging means into engagement with the filter plate.

6. The apparatus according to claim 3, 4 or 5 wherein said levers are provided with an edge functioning as a cam to ride on the pins and move said levers out of engagement on movement of said conveyors.

7. The apparatus according to claim 6, wherein said levers have a rear arm for engaging the conveyor and limit pivoting thereof.

* * * * *